ABSTRACT

United States Patent [19]
Dial

[11] Patent Number: 4,944,188
[45] Date of Patent: Jul. 31, 1990

[54] FASTENER TESTER

[76] Inventor: John H. Dial, 25 Ranger Rd., Cartersville, Ga. 30120

[21] Appl. No.: 350,091

[22] Filed: May 10, 1989

[51] Int. Cl.$^5$ ............................................. F16B 31/02
[52] U.S. Cl. ......................................... 73/761; 411/14
[58] Field of Search .......................... 73/761; 116/212; 411/14

[56] References Cited

U.S. PATENT DOCUMENTS

| | | | |
|---|---|---|---|
| 3,382,709 | 5/1968 | Sorensen | 73/761 |
| 3,429,179 | 2/1969 | Bowen et al. | 73/761 X |
| 3,563,087 | 2/1971 | Brunelle et al. | 73/761 |
| 4,554,838 | 11/1985 | Paus | 73/761 |
| 4,791,839 | 12/1988 | Bickford et al. | 73/761 |

*Primary Examiner*—Daniel M. Yasich
*Attorney, Agent, or Firm*—John C. Garvin, Jr.; Harold W. Hilton

[57] ABSTRACT

An apparatus for testing the integrity of a fastener under load. The apparatus includes an actuating assembly and a tensile loading structure mounted in serial relationship. The actuating assembly includes a piston and cylinder assembly. The cylinder heads are supported by a plurality of rods which are secured to a plurality of compressions rods of the tensile loading structure. The piston rod extends through an upper cylinder head and is connected to a movable shackle. A second shackle is secured to a cap or top member of the tensile loading structure. A bolt to be tested is secured in removable inserts carried in the shackles. A gage reads the amount of force, in pounds, applied to the bolt. An enclosure is provided for enclosing the tensile loading structure for protecting people and materials in the testing area, and wheels are disposed on a cabinet which supports the actuating mechanism and the tensile loading structure to provide portability to the apparatus.

22 Claims, 10 Drawing Sheets

FASTENER TESTER

FIELD OF THE INVENTION

This invention relates to an apparatus for testing fasteners and particularly to a safe, fast acting tester for fasteners such as bolts, nuts and screws.

BACKGROUND OF THE INVENTION

It has been found, as a result of a recent congressional committee's investigation, that millions of substandard bolts and nuts have been used in items ranging from military equipment and weapons to the space shuttle and commercial vehicles. The problem has wide-ranging effects which concerns our nation's military as well as our nation's economy. For example, it was found necessary to remove over 1000 M-60 tanks out of the Army's readiness inventory for at least two months to replace defective bolts in the gun mounts. Substandard fasteners were found to have been earmarked for use on both submarines and aircraft catapult systems of the aircraft carriers. The fasteners contained more boron and less carbon than specified in industry standards, making them more likely to break or shear. NASA grounded its fleet of experimental aircraft at one of its facilities pending inspection for substandard fasteners. Widespread counterfeiting and failures of SAE grade 8.0 and other high-strength fasteners have been reported in building and construction sites, coal mines, helicopters, highway bridges and guard rails, nuclear and fossil fuel utilities, grain storage facilities, and commercial trucks and vehicles.

As a result of these fastener failures it became increasingly clear that a need exists for means to permit accurate and timely testing of all sizes of such fasteners to assure that they are safe to use. It is desirable, therefore, to provide a fastener testing apparatus which is versatile enough to test large diameter fasteners, (up to 1½" diameter, which typically requires a relatively large structure capable of producing large tensile loads) and also to test smaller diameter fasteners, which do not require such large structures and such large tensile loads. It is also desirable that such testing apparatus have the capability of being mobile so as to permit field testing of fastener.

It is an object of the present invention therefore, to provide a testing apparatus for testing various sizes of fasteners under varying tensile loads.

It is another object of the present invention to provide such a testing apparatus which is safe, reliable, compact, versatile and mobile.

It is yet another object of the present invention to provide such a testing apparatus with changeable specimens supporting interfaces which will provide the test apparatus with the versatility which is needed to test fasteners of various sizes.

It is still another object of the present invention to provide such a safe, compact testing apparatus with fast acting actuating means which accomplishes the testing in a rapid and facile manner.

DESCRIPTION OF THE PREFERRED EMBODIMENT

Figure 1:
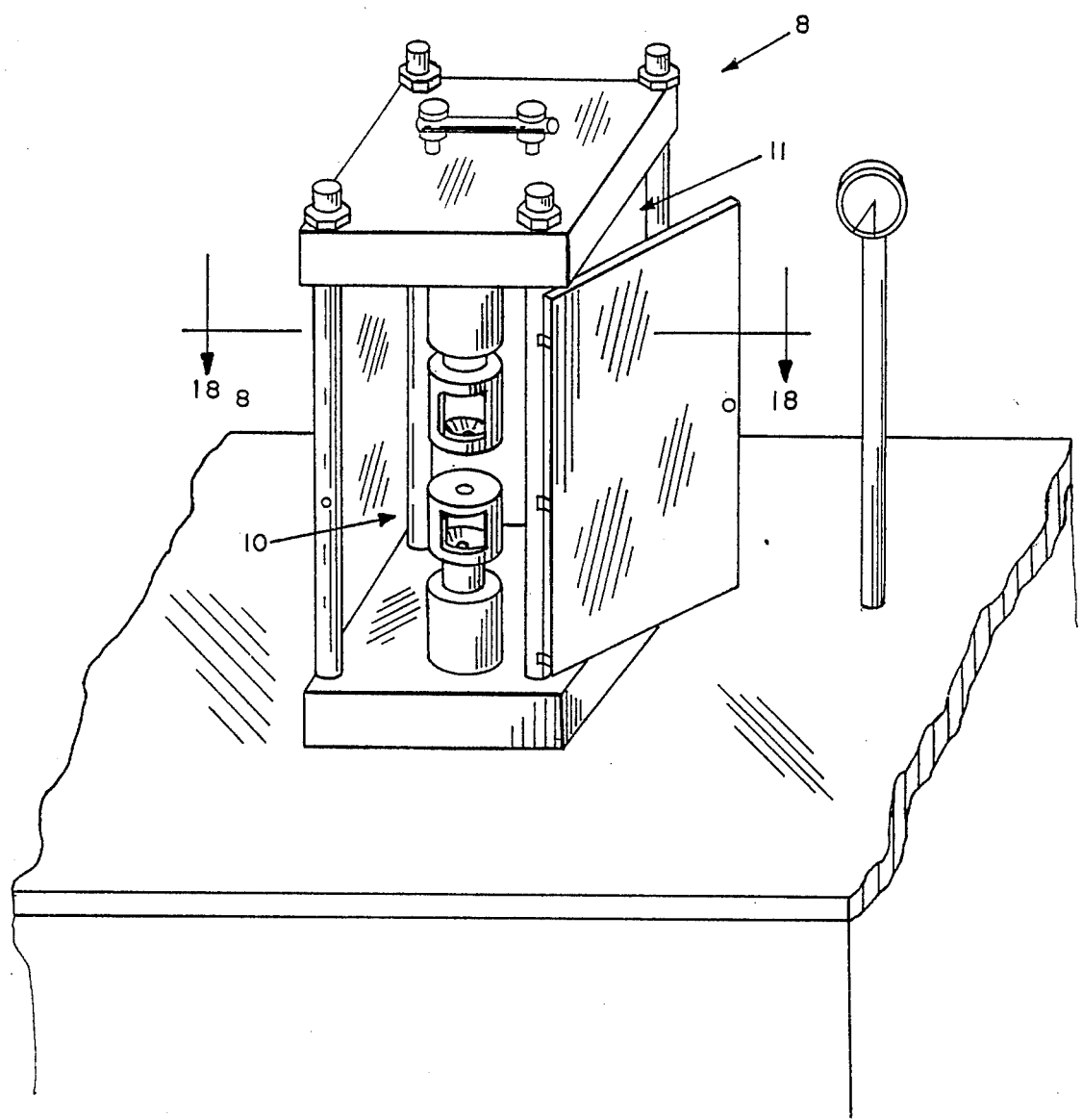
FIG. 1 is a pictorial view of the fastener testing apparatus of the present invention including the enclosure therefor.
Figure 2:
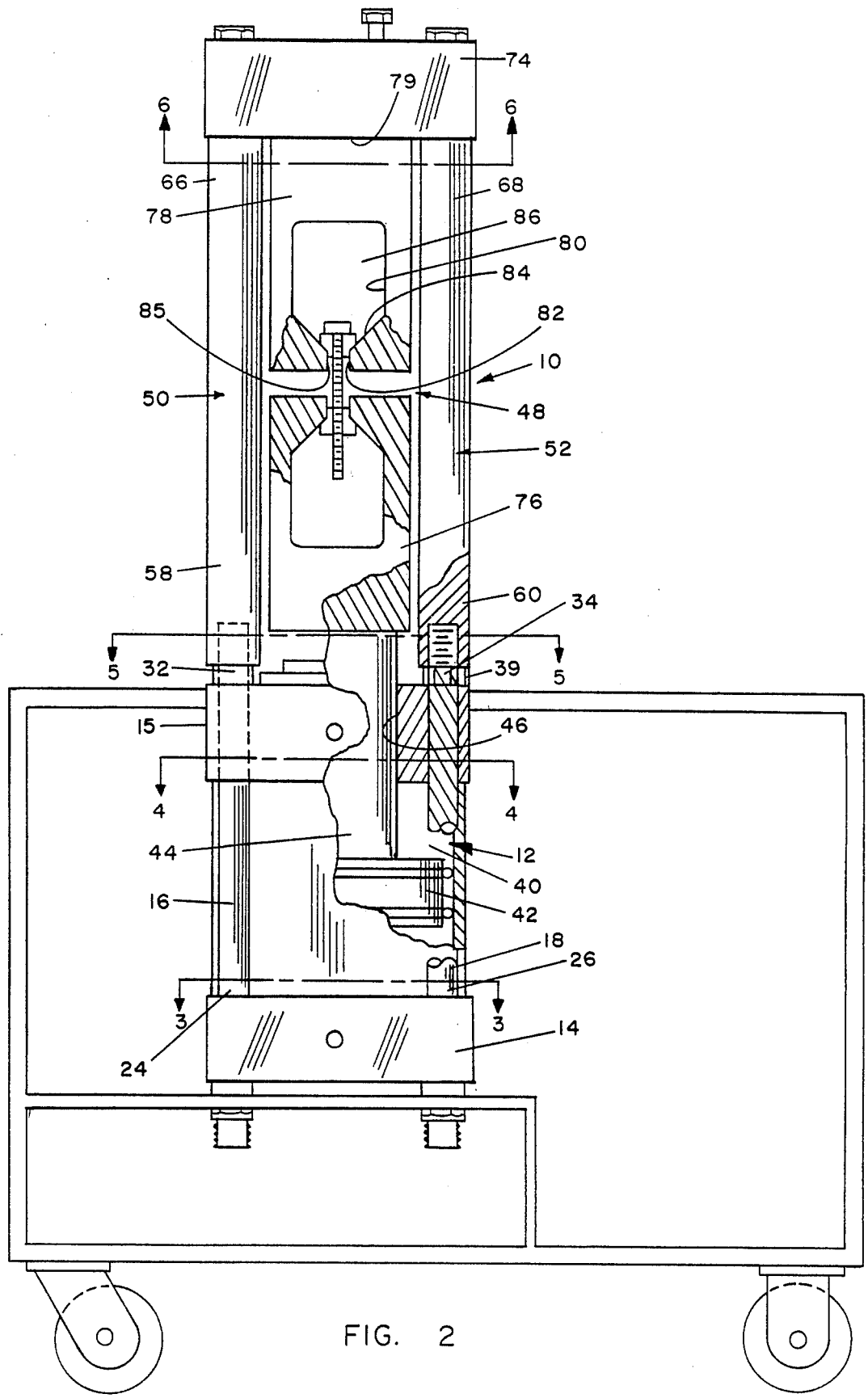
FIG. 2 is an elevational view of the fastener testing apparatus of FIG. 1 with the enclosure removed.
Figure 3:
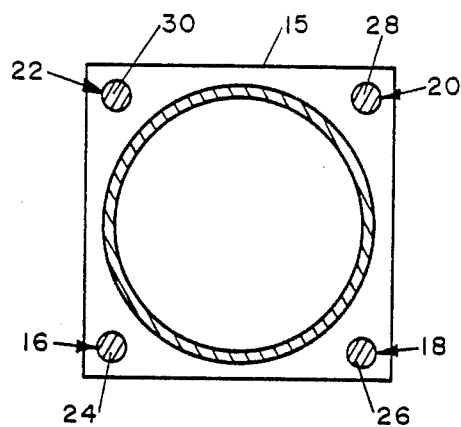
FIG. 3 is a sectional view taken along line 3—3 of FIG. 2.
Figure 4:
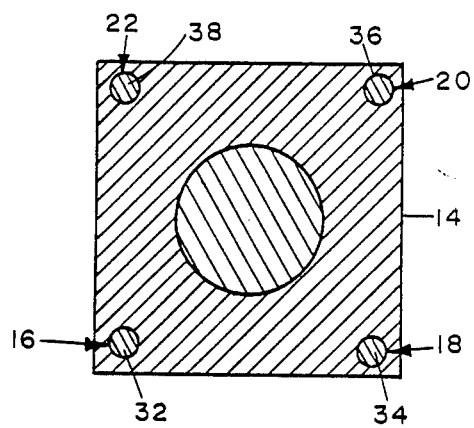
FIG. 4 is a sectional view taken along line 4—4 of FIG. 2.

As seen in FIG. 1, a fastener testing apparatus 8 is shown to include the tensile test device 10 and a housing 11 enclosing the test device 10. FIG. 2 is an elevational view of the test device 10 and as shown in FIG. 2, test device 10 includes a high pressure piston cylinder assembly 12 comprised of a base member 14 and an upper plate member 15 disposed in spaced relation. Assembly 12 further includes four rods 16, 18, 20 and 22 (FIGS. 3 and 4) which extend between and through members 14 and 15. The rods include lower portions 24, 26, 28 and 30 which extend through base member 14 and are secured thereto, and upper portions 32, 34, 36 and 38 which extend through member 15 and is secured thereto by nuts 39. Piston cylinder assembly 12 includes a cylinder 40 secured between members 14 and 15, which form the cylinder head and base of the piston cylinder, and a piston 42 slideably mounted in the cylinder. Piston 42 is provided with a piston rod 44 which extends through an opening 46 in cylinder head 15.

Figure 5:
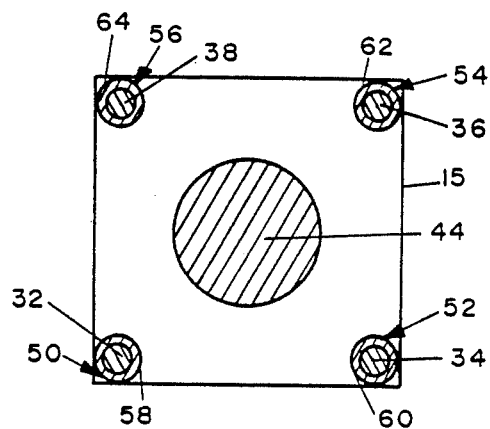
FIG. 5 is a sectional view taken along line 5—5 of FIG. 2.
Figure 6:
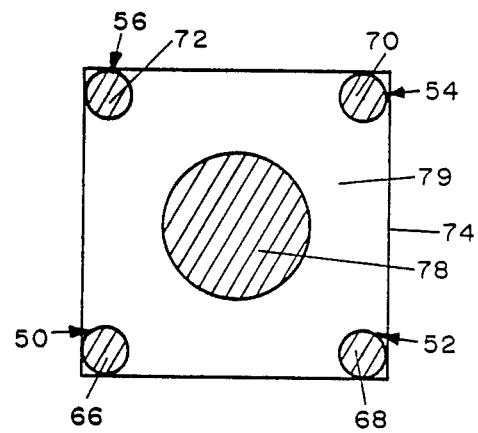
FIG. 6 is a sectional view taken along line 6—6 of FIG. 2.

A support structure 48 for a pair of fastener holders (shackles) is mounted on the top of cylinder assembly 12 in axial alignment therewith. The support structure 48 (FIG. 2) includes a plurality of compression rods 50, 52, 54 and 56 having lower tapped ends 58, 60, 62 and 64 (FIG. 5) and upper threaded ends (FIG. 6) 66, 68, 70 and 72, respectively. Lower tapped ends 58, 60, 62 and 64 are disposed to receive in threaded relation therein, the upper threaded ends 32, 34, 36 and 38 of the rods 16, 18, 20 and 22 of the piston cylinder assembly 12. At the upper ends 66, 68, 70 and 72 of compression rods 50, 52, 54 and 56 is mounted a cap member 74. A lower fastener support (shackle) 76 is secured (by threaded connection or other means) to an upper surface of piston rod 44. An upper fastener support (shackle) 78 is secured, to the lower surface 79 of cap member 74.

The shackles are disposed to receive a fastener therein and each shackle includes an annular body having a large axial opening 80 communicating with a small opening 82 through an annular fastener support surface 84 of the shackle. Support surfaces 84 are disposed in angular relation (preferably 45°) and terminate at the side walls of openings 82 to form an annular shoulder 85 thereon. A forward opening 86 is provided in each shackle through which the fastener is inserted. Opening 86 communicates into opening 80.

To give the test apparatus the versatility to test very large diameter fasteners (at least up to 1½" diameter) of relatively long length, and smaller diameter fasteners of relatively short length, a plurality of collets are provided to be inserted in the seats of the shackles to support a fastener therein.

It is difficult to design a fastener testing system that is versatile in the diameter and length of fasteners to be tested. As a large diameter (1½ inch) fastener requires a relatively large tensile test load, the support structure required to support such a large load must be large relative to the support structure for smaller fasteners.

Figure 9:
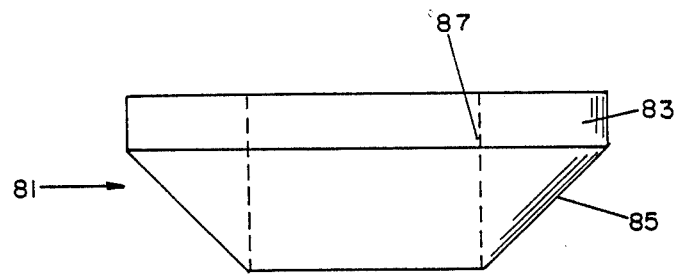
FIG. 9 is an elevational view illustrating a collet used in testing very large bolts.

The tapered conical collet-to-shackle interface design of the present invention provides an avenue for testing both long and short fasteners. A collet 81 for testing large fasteners is illustrated in FIG. 9. This collet is shown to include an upper shoulder 83, a tapered surface 85, and an opening 87 through the body of the collet. Surface 85 is tapered at the same angle as surfaces 84 of the shackles (preferably 45°).

Figure 10:
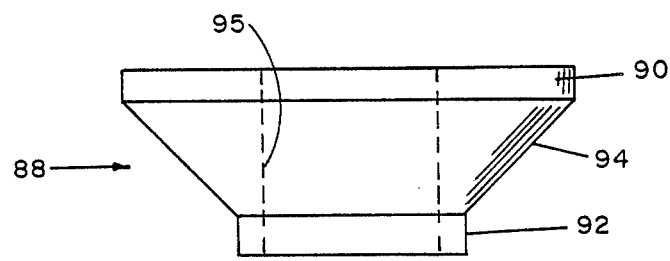
FIG. 10 is an elevational view illustrating a collet that is used in testing bolts of smaller size than those tested in the collet of FIG. 9.

Another collet, used for testing fasteners of smaller size than those tested in the collet of FIG. 9 is shown in FIG. 10. As seen in FIG. 10, this collet 88 includes a large diameter annular section 90, a small diameter section 92 and an intermediate tapered section 94 between sections 90 and 92. Section 94 is tapered at the same angle as surfaces 84 of the shackles (preferably 45°). An opening 95 is provided through the body of the collet.

Figure 8:
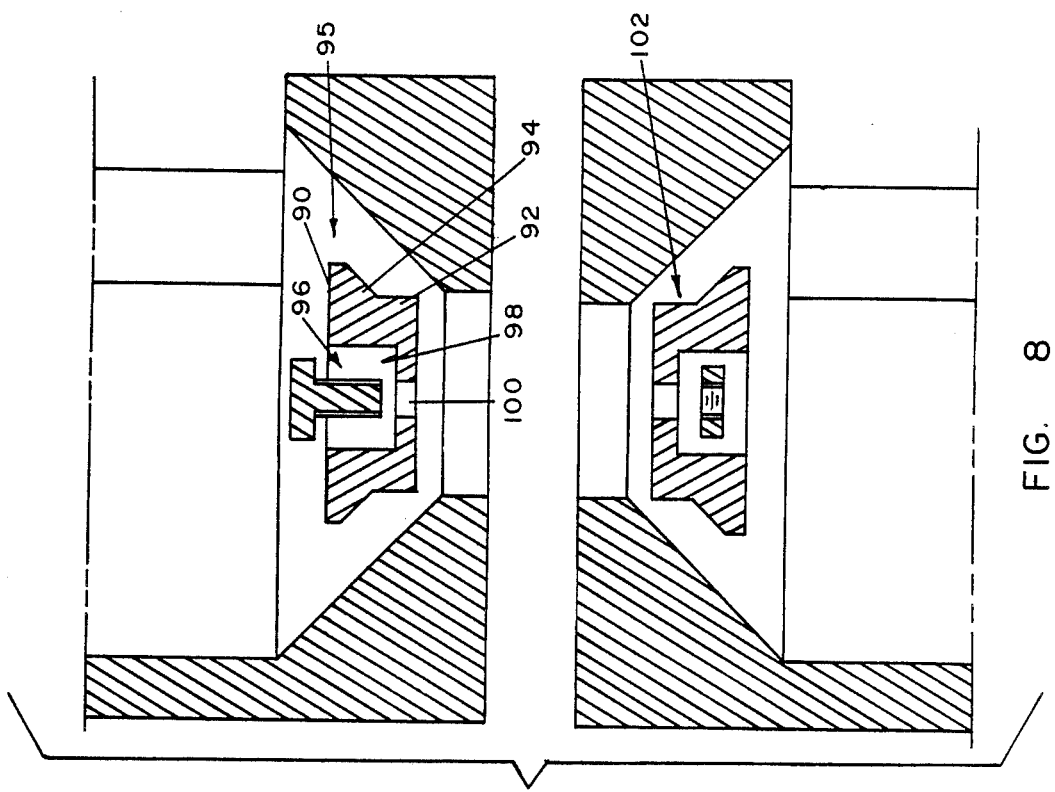
FIG. 8 is a sectional view taken along line 8—8 of FIG. 7.
Figure 7:
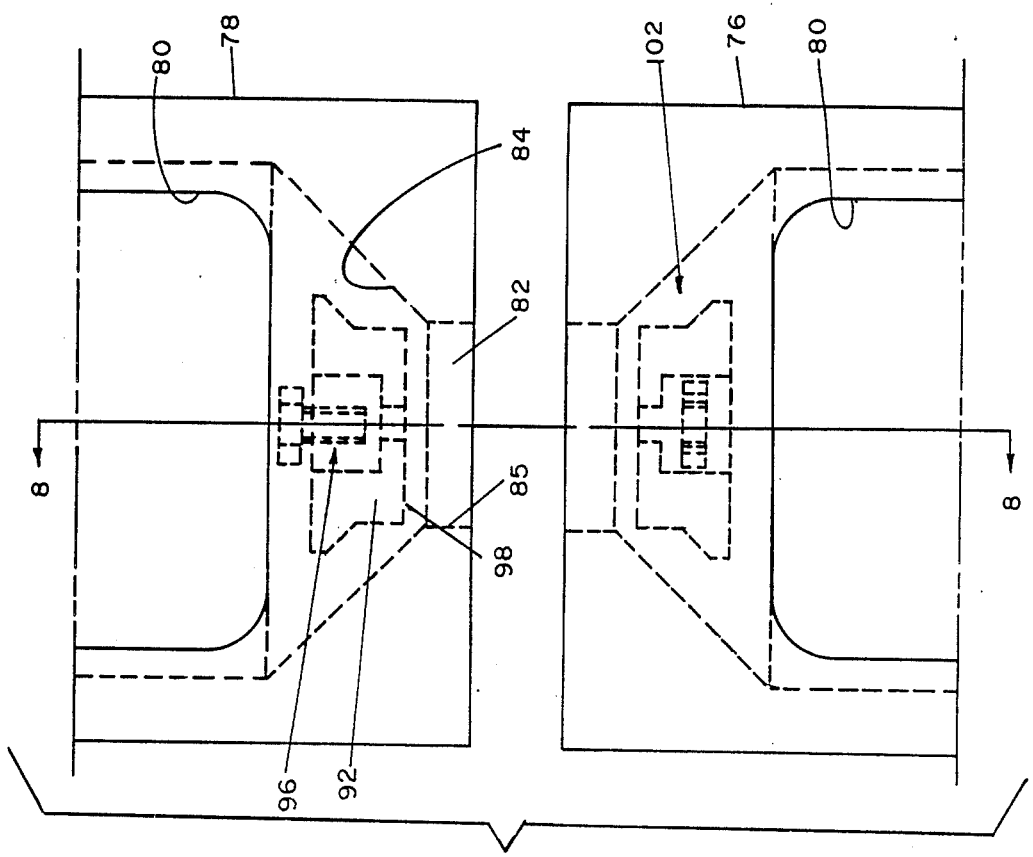
FIG. 7 is a partial elevational view illustrating a pair of collets used in seating a bolt and upper and lower shackles of the testing apparatus.
Figure 11:
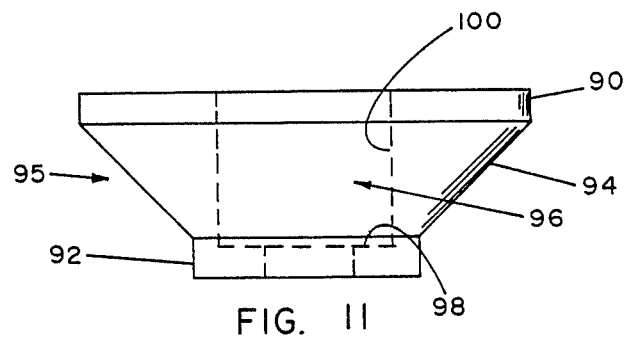
FIG. 11 is an elevational view of a collet that is used in testing bolts of smaller size than those tested in the collet of FIG. 10.
Figure 12:
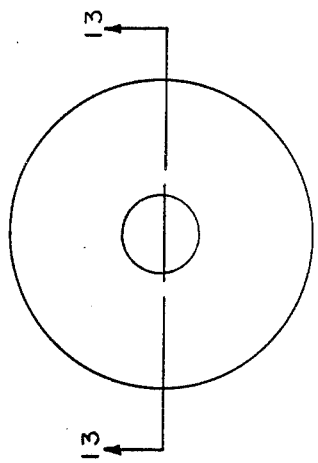
FIG. 12 is a top view illustrating a threaded collet for testing very short bolts, i.e. bolts that are shorter than those tested in the collet of FIG. 11.
Figure 13:
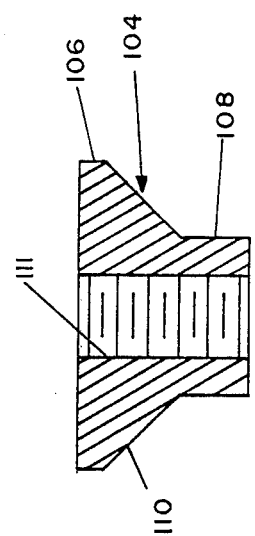
FIG. 13 is a sectional view along line 13—13 of FIG. 12 of the collet shown in FIG. 12.

Another collet 95 for testing even smaller fasteners is disclosed in FIGS. 7, 8 and 11. In this embodiment collet 95 is similar in external configuration to the collet shown in FIG. 10; however, this collet is provided with a recessed portion 96 defined by an annular shoulder 98. An opening 100 is provided through the body of the collet. As seen in FIGS. 7 and 8, the collets of this embodiment are shown mounted in the shackles of the test apparatus of the present invention as an example of the relationship between the collets of the invention and the shackles. As seen in FIGS. 7 and 8 the collets are positioned to be inserted in the shackles with lower annular section 92 in opening 82 of the shackle. The fastener is positioned in the recess of the collet with the head of the fastener mating with shoulder 98 and the shank extending through opening 100. A nut securing shackle 102 is similar in structure but is disposed to receive the nut of the fastener assembly therein.

FIGS. 12-17 illustrate different embodiments for testing fasteners of smaller diameters and lengths than those previously disclosed. As seen in these Figures, an internally threaded collet is used and no separate nut is used in conjunction with these internally threaded collets since these collets are nuts having an external tapered surface. Collet 104 is shown to have an annular configuration and includes a large diameter annular section 106, a small diameter annular section 108 and an intermediate tapered section 110 between sections 106 and 108. Section 110 is tapered at the same angle as surfaces 84 of the shackles, (preferably 45°). Collet 104 includes an internal threaded opening 111 to receive the bolt in threaded relation therein.

Figure 15:
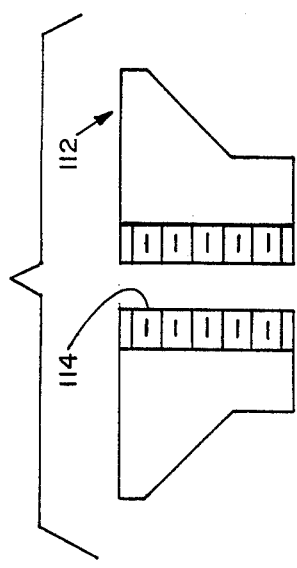
FIG. 15 is an elevational view along line 15—15 of the sectional collet of FIG. 13.
Figure 14:
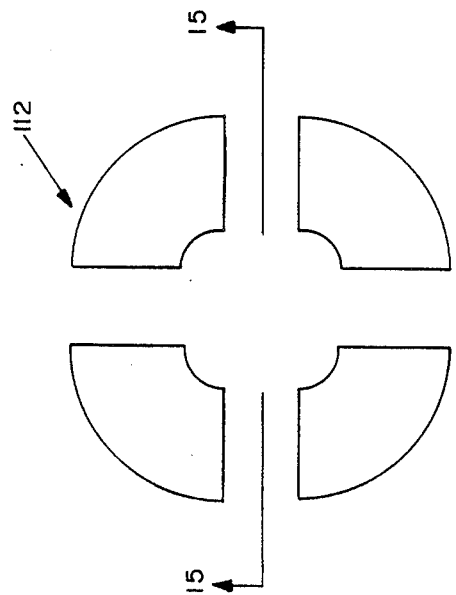
FIG. 14 is a plan view of another embodiment showing a sectional collet of the present invention. This collet is designed for testing very short bolts when thread failure is anticipated.
Figure 17:
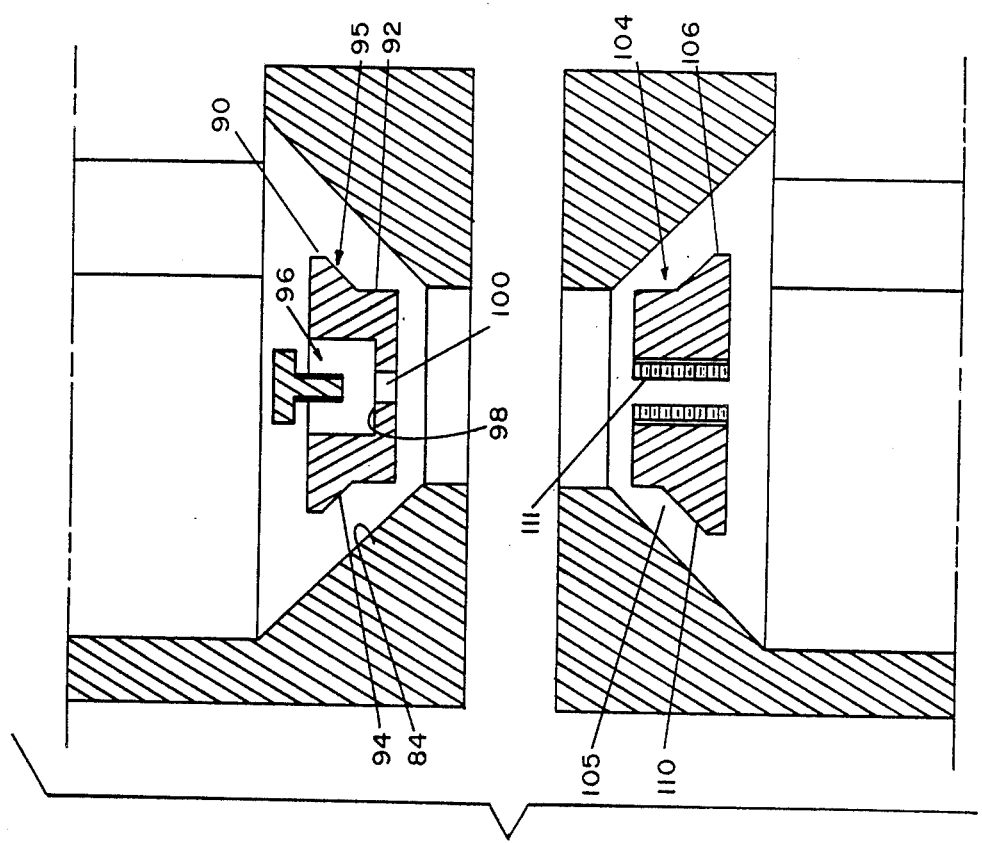
FIG. 17 is a sectional view taken along line 17—17 of FIG. 16.

For testing fasteners, where thread failure is expected, a collet 112 illustrated in FIGS. 14 and 15 may be used. In this embodiment, the collet is disposed in four separate sections, each section disposed for mating with the other sections to provide an annular configuration, made up of each section, and provided with a threaded opening 114 therethrough.

Figure 18:
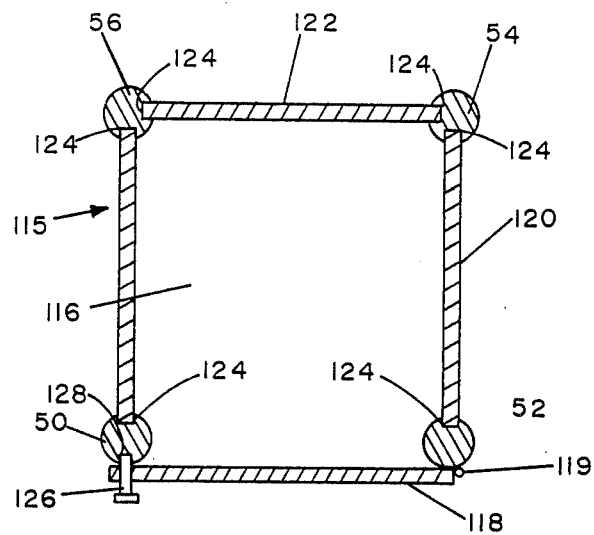
FIG. 18 is a sectional view taken along line 18—18 of FIG. 1 illustrating one embodiment of the enclosure of the testing apparatus.
Figure 19:
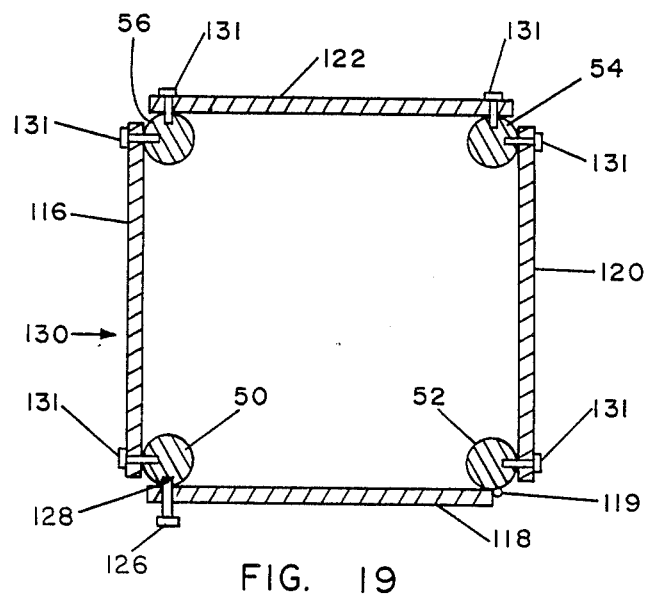
FIG. 19 is a view similar to FIG. 18 illustrating another embodiment of the enclosure of the testing apparatus.

Enclosure assemblies for enclosing the fastener and shackles during testing of the fastener is illustrated in FIGS. 18 and 19. As seen in FIG. 18 the closure assembly 115 includes a plurality of steel plates 116, 118, 120 and 122 (typically ¼" thick) which are mounted in vertical grooves 124 provided in compression posts 50, 52, 54 and 56. Plates 118 and 122 define the front and back sections of the enclosure 115 and plates 116 and 120 define the sides of the enclosure assembly 115. Front section 118 is hinged to post or rod 52 by hinges 119 to form a door to provide access into the enclosure assembly. A latching assembly which may include a threaded pin 126 disposed for threaded engagement with a tapped opening 128 of rod 50 is provided to secure the door to closed position during testing of the fastener.

Figure 16:
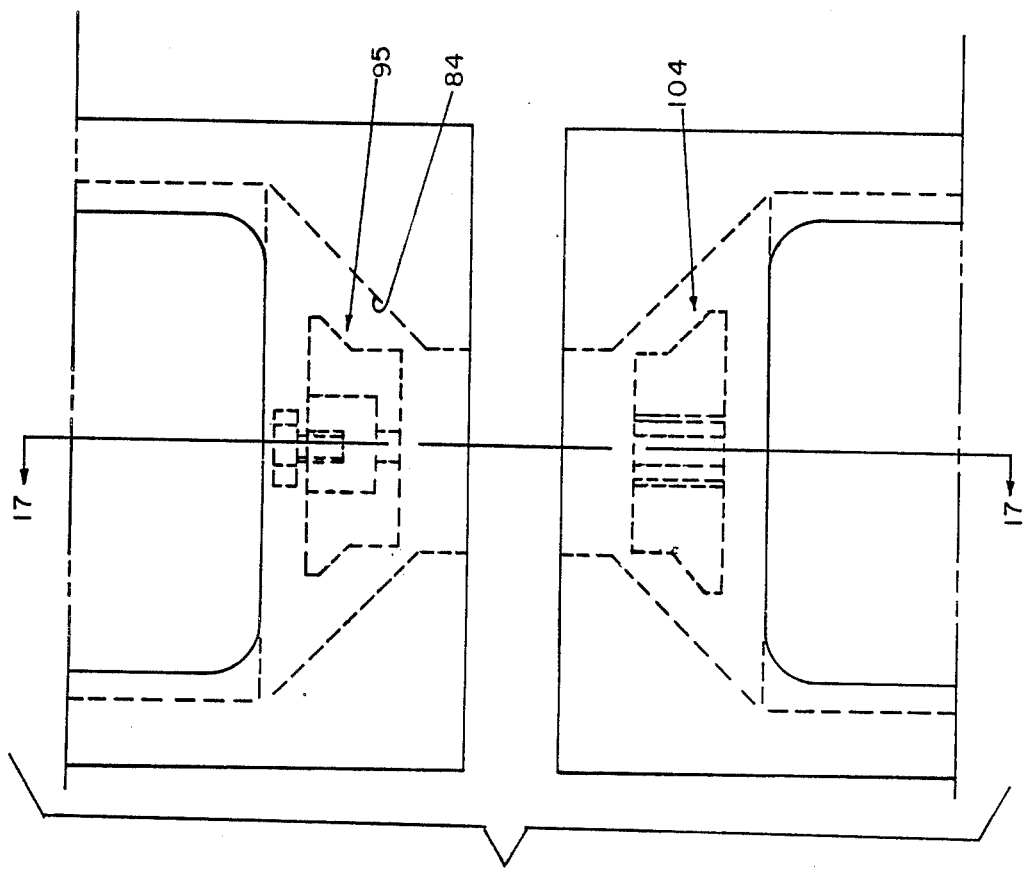
FIG. 16 is an elevational view similar to FIG. 7 with the collet of FIG. 15 inserted in the lower shackle to receive the bolt in threaded relation therein.

Another type of enclosure assembly 130 is shown in FIG. 16 wherein the plates 116, 120 and 122 are secured to compression posts 50, 52, 54 and 56 by screws 131 instead of being held in grooves as described, supra.

Figure 20:
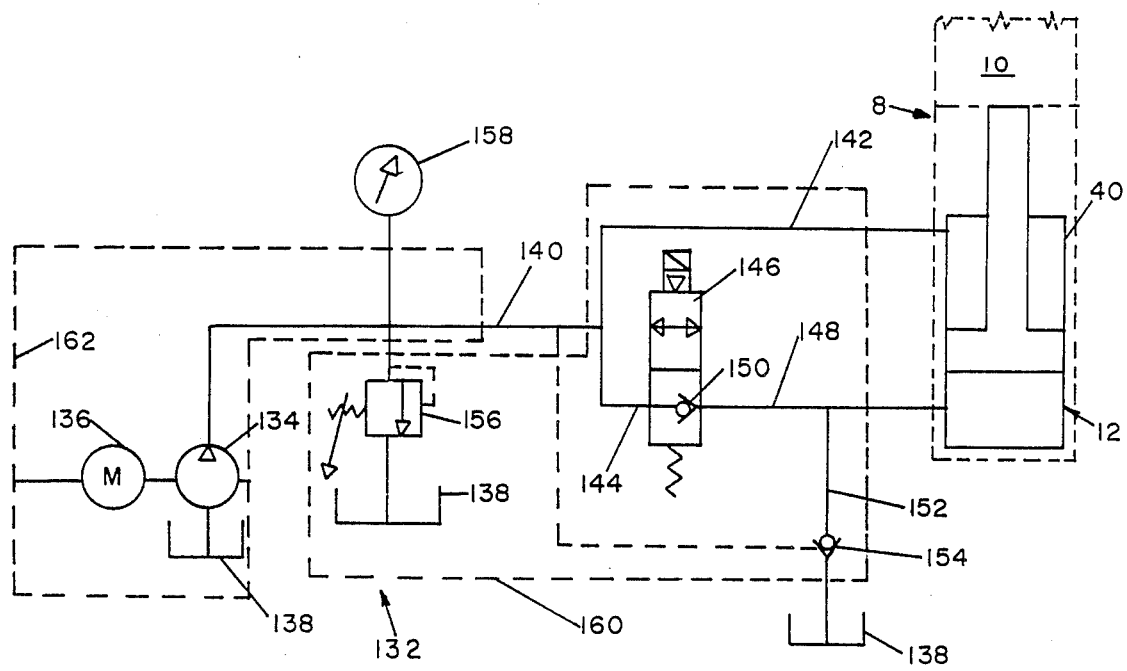
FIG. 20 is a diagrammatic view illustrating a hydraulic system for actuating the piston of the test apparatus.

FIG. 20 illustrates one type of actuating mechanism 132 for actuating the piston assembly 12 of the present invention. As seen in FIG. 20, a high pressure pump 134, (approximately 6000 PSI) driven by electric motor 136 is disposed for directing hydraulic fluid from a hydraulic reservoir 138 through a line 140 which connects to a pair of hydraulic lines 142 and 144. Line 142 is connected to cylinder 40 of piston assembly 12 and line 144 is connected to a directional valve 146 which is connected to cylinder 40 by a hydraulic line 148 having a check valve 150 connected thereto. Line 148 is also connected to hydraulic reservoir 138 through another hydraulic line 152 having a check valve 154 therein. A pressure relief valve 156 is connected between reservoir 138 and hydraulic line 140. A gage 158 is connected in hydraulic line 140. A dash line of FIG. 20 encloses those components which make up a modular controls manifold 160. Another dash line 162 encloses those components which are manufactured by the Vickers Corp. These latter enclosed components make up the power unit for the hydraulic system.

Figure 21:
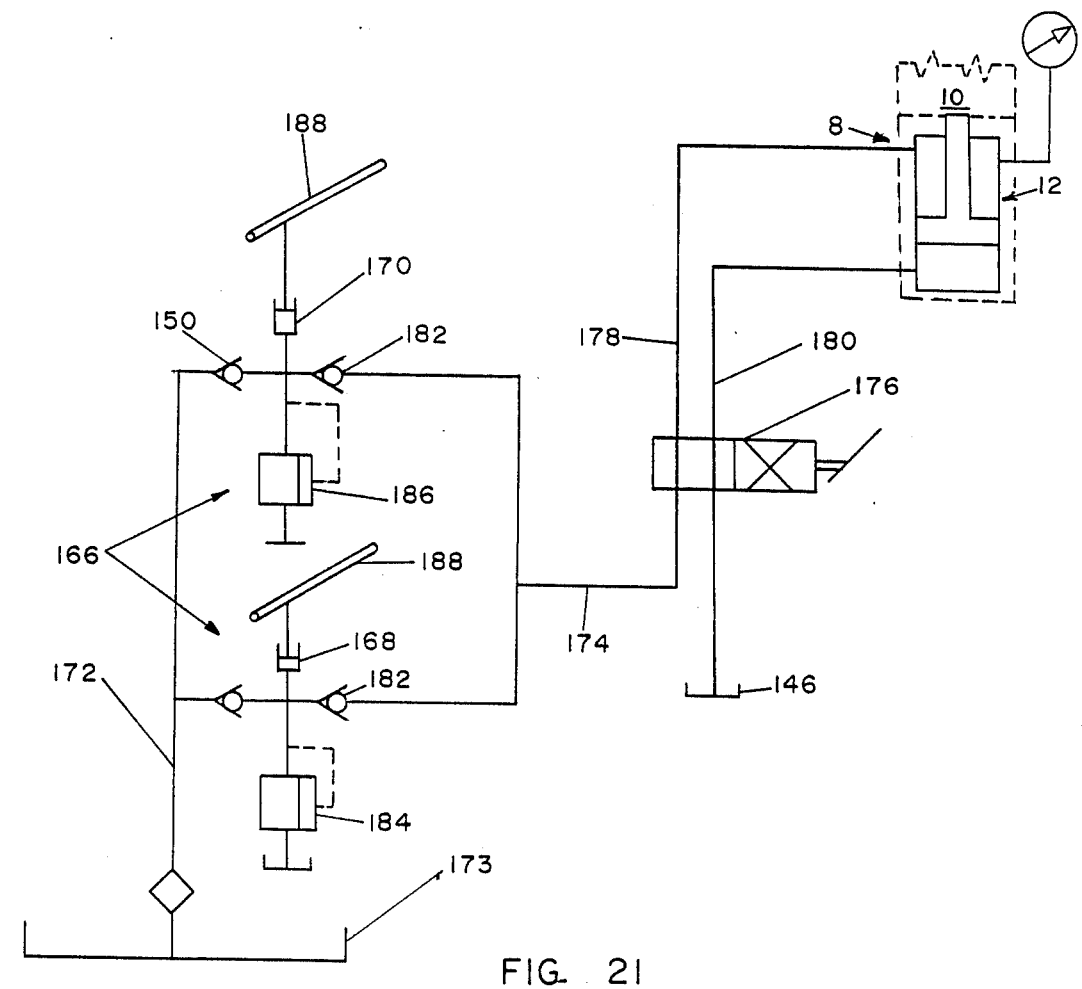
FIG. 21 is a diagrammatic view illustrating a two-stage hand operated hydraulic system for actuating the piston of the test apparatus.

A second type of piston actuating means is shown in FIG. 21, in which the actuating means is a two stage manually operated pump 166. The stages are indicated by the numerals 168 and 170 with stage 168 being the low pressure stage and 170 being the high pressure stage. The low pressure stage has been designed to have an upper limit of 350 PSI and the high pressure stage has been designed to have an upper limit of 5000 PSI. A fluid line 172 is connected between the pump and a reservoir 173 and a fluid line 174 is connected between the pump and the piston cylinder assembly 12. A directional valve 176 controls flow of hydraulic fluid to and from the piston assembly to the hydraulic fluid reservoir through fluid lines 178 and 180. Check valves 182 are provided in the fluid lines connecting the pump to the reservoir and to the piston cylinder assembly. A relief valve 184 limits the pressure in the first stage to 350 PSI and a second relief valve 186 limits the pressure in the second stage to 5000 PSI. A handle 188 is provided for manually operating the pump. A pressure gage 158 is connected to cylinder 40.

Figure 22:
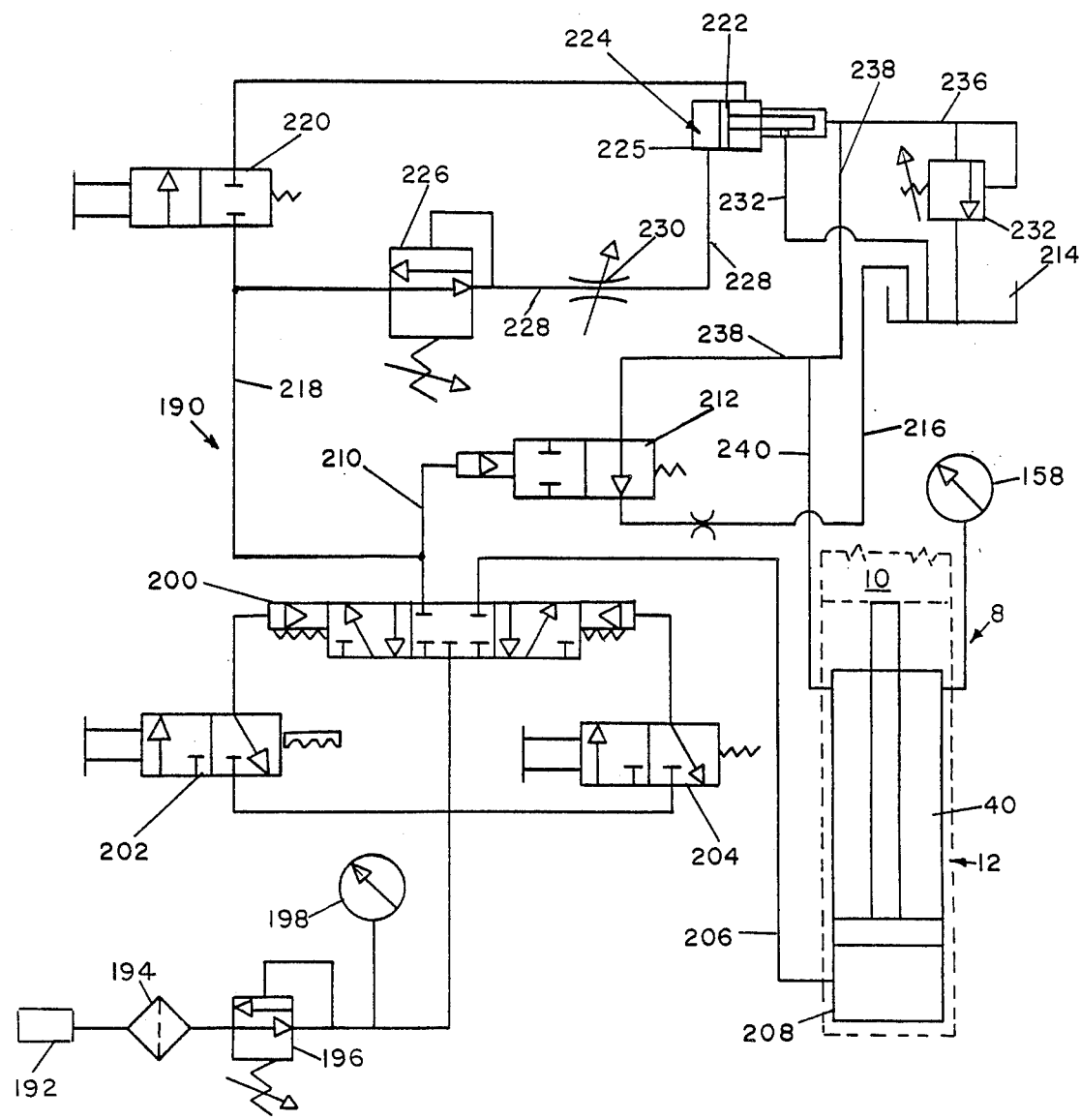
FIG. 22 is a diagrammatic view illustrating a combined pneumatic-hydraulic system for actuating the piston of the test apparatus.

Another embodiment of the actuating mechanism is shown in FIG. 22. As seen in FIG. 22 this actuating mechanism 190 includes a source of air pressure 192 which directs air through a filter 194 and through an air pressure regulator 196. The air pressure is indicated by a gage 198. Air is then directed to a directional valve 200 and is controlled by parallel pilot valves 202 and 204. Directional valve 200 is a three position, five way, spring centered, close centered, air piloted valve. Pilot valve 202 is a two position, three way, manually operated, normally closed, detect open lock valve. Pilot valve 204 is a two position, three way, manually operated, normally closed, spring operated valve. FIG. 22 illustrates a pressure line 206 connected between directional valve 200 and one end 208 of piston cylinder assembly 12. Another line 210 connects the directional valve 200 to a hydraulic valve 212 which is a two position, two way, air pilot operated, normally open, spring loaded valve. One side of valve 212 is connected to a hydraulic reservoir 214 by line 216. Concurrent to the connection of line 210 to valve 212, another line 218 connects directional valve 200 to an air valve 220 and to a pressure regulator 226. Valve 220 is a two position, two way, manually operated, normally closed spring valve. Valve 220 is to return the piston 222 of an air driven liquid pump 224 to full stroke for precise pressure application. Pump 224 may be similar to such liquid pumps known as Haskell intensifiers and manufactured by Haskell, Inc. of Burbank, Calif. A pressure regulator 226 is disposed in a line 228 which connects pump 220 with the liquid pump cylinder 225 on the opposite face of piston 222. An air restrictor 230 is secured in line 228. Pump 224 is connected to hydraulic reservoir 214 by a line 236 and to an adjustable pressure relief valve 232 through a line 236. A line 238 also connects liquid pump 224 to valve 212 and to line 240 which is connected to hydraulic piston cylinder 40.

As can be seen in FIGS. 20, 21 and 22, the cylinder 40 is connected to a pressure gage which indicates in pounds the amount of pull pressure applied by the shackles to the fastener. The gage is a glycerin gage having a memory. A memory indicator hand is provided thereon and indicates the highest load placed on the fastener during testing thereof Similar gages are manufactured by Noshok, Inc.

It is to be understood that although particular embodiments of the invention are shown and described, the invention is not to be limited to only those particular embodiments since various changes and modifications may be made in the details of the construction without departing from the spirit and scope of the appended claims.

I claim:

1. An apparatus for testing the performance of a fastener under load comprising:
   an actuating assembly including:
   a piston and cylinder assembly including a piston reciprocally mounted in a cylinder and having a piston rod extending from said cylinder;
   a base member and a cap member disposed in spaced relation;
   a plurality of support rods secured to said base member and extending through said cap member, said support rods being secured to said base member and said cap member; and,
   actuating means for actuating said piston for the reciprocal movement thereof.
   a tensile loading structure including:
   a plurality of compression rods, each said compression rod having lower and upper ends with a said lower end of each compression rod being secured to a said support rod of said actuating assembly and extending upwardly therefrom, a second cap member secured to said compression rods at said upper ends thereof;
   a pair of shackles disposed for securing a fastener therein, a first of said pair of shackles secured to said piston rod for movement therewith, a second of said pair of shackles secured to said second cap member;
   a recording member connected to said piston cylinder of said actuating assembly for recording the amount of tension being applied to said fastener through said shackles; and
   an enclosure for enclosing said tensile loading structure.

2. Apparatus as set forth in claim 1 with said lower ends of said compression rods include lower portions having tapped openings therein and said support rods being provided with upper threaded ends for threaded relation with said lower ends of said compression rods.

3. Apparatus as in claim 2 wherein said enclosure includes a plurality of protective plates secured directly to said compression rods, one of said plates disposed in hinged relation with one of said compression rods to form a door to provide access into said enclosure, and, means for securing said one plate to a second of said compression rods.

4. Apparatus as set forth in claim 3 wherein said recording means is a glycerin force gage having a memory hand.

5. Apparatus as set forth in claim 4 wherein said actuating means includes a hydraulic pump, a hydraulic reservoir disposed in communication with said hydraulic pump, said pump disposed for pumping hydraulic fluid into and out of said reservoir, a hydraulic cylinder and piston assembly flow connected to said pump to receive hydraulic flow therefrom, a directional valve secured between said pump and said reservoir for controlling the direction of hydraulic fluid flow to and from said piston cylinder, a relief valve connected between said pump and said cylinder; and said gage being connected between said cylinder and said pump.

6. Apparatus as set forth in claim 5 wherein said hydraulic pump is provided with an outlet, a first hydraulic line connected to said outlet, second and third hydraulic lines connected to said first hydraulic line, said second hydraulic line connected to said cylinder on a first side of said piston, said third hydraulic line connected to said cylinder on a second side of said piston, said directional valve being mounted in said third hydraulic line between said reservoir and said pump.

7. Apparatus as set forth in claim 4 wherein said actuating means is a double acting hydraulic pump having first and second pressure stages, said pump connected to said piston cylinder assembly for directing hydraulic fluid thereto under two different conditions having predetermined limits, the first condition being a fast acting low pressure condition, the second condition being a high pressure condition.

8. Apparatus as set forth in claim 7 wherein the predetermined limit of said first stage is 350 PSI.

9. Apparatus as set forth in claim 8 wherein the predetermined limit of said second stage is 5000 PSI.

10. Apparatus as set forth in claim 7 wherein said double acting pump includes a handle for manual actuation thereof.

11. Apparatus as set forth in claim 4 wherein said actuating means includes combined pneumatic and hydraulic systems for actuating said piston of said actuating assembly, said pneumatic system comprising a source of air, a directional valve, pilot valve means connected to source of air and to said directional valve, an air driven liquid pump connected to said directional valve, a source of hydraulic fluid connected to said air driven liquid pump, said cylinder of said first piston and cylinder assembly being connected to said air driven pump, a hydraulic valve connected to said directional valve, to said reservoir and to said air driven pump, said hydraulic valve disposed for recessing hydraulic fluid from said reservoir and for pumping said fluid to said first piston and cylinder assembly responsive to actuation of said directional valve.

12. Apparatus as set forth in claim 11 including an air valve mounted between said liquid pump and said directional valve.

13. Apparatus as set forth in claim 12 including a pressure regulator disposed between said liquid pump and said directional valve.

14. Apparatus as set forth in claim 13 including first pressure regulating means disposed between source of air and said directional valve.

15. Apparatus as set forth in claim 14 including second pressure regulating means disposed between said air valve and said liquid pump.

16. Apparatus as set forth in claim 15 including pressure relief valve means disposed between said reservoir and said liquid pump.

17. Apparatus as set forth in claim 4 wherein collets are provided for securing said bolts in said shackles, said collets being disposed for providing the apparatus with the versatility for testing bolts of various diameters and sizes.

18. Apparatus as set forth in claim 17 wherein a said collet includes a body having an upper annular portion joined by a lower tapered portion, said body having an axial opening therethrough.

19. Apparatus as set forth in claim 18 wherein said tapered portion of said collet is joined by an annular portion having an opening therethrough.

20. Apparatus as set forth in claim 19 wherein said body includes a recessed portion defined by an inwardly projecting shoulder.

21. Apparatus as set forth in claim 17 wherein said collet a body having an upper annular portion, a lower annular portion and an intermediate tapered portion, said body having a threaded opening therethrough.

22. Apparatus as set forth in claim 21 wherein said body is comprised of four separate sections.

* * * * *